United States Patent [19]
King

[11] 3,893,145
[45] July 1, 1975

[54] FLASH EXTENDER AND CAMERA SUPPORT

[76] Inventor: Dwayne L. King, 395 Grove St., No. 1435, Reno, Nev. 89502

[22] Filed: Apr. 19, 1974

[21] Appl. No.: 462,418

[52] U.S. Cl. ................................. 354/293; 240/1.3
[51] Int. Cl. ........................................... G03b 17/56
[58] Field of Search ...................... 354/293; 240/1.3

[56] References Cited
UNITED STATES PATENTS

| | | | |
|---|---|---|---|
| 2,560,200 | 7/1951 | Werzyn | 240/1.3 |
| 2,949,838 | 8/1960 | Skalabrin | 354/293 |
| 3,187,170 | 6/1965 | Kille | 240/1.3 |

*Primary Examiner*—John M. Horan
*Attorney, Agent, or Firm*—Birch and Birch

[57] ABSTRACT

An adjustable portable hand held strobe extender and camera support unit made of detachable and extensible sections in combination with a camera support platform and handle grip means with a top land or plane surface connected at the lower end of the extender in one socket of a two-way pan connector. The strobe extender and camera support may be detached from each other and the extender is angularly adjustable. The strobe or electronic flash is universably mounted on the upper end of the extender by a ball joint for easy angular adjustment to provide comfortable flash illumination of a subject to be photographed with minimum flash reflection, to thereby minimize the importance of special films and filters and careful shutter speed settings of a camera mounted on the support platform secured to the end of the handle grip means of the support unit. Also, a support extender bar from the camera support is provided to accommodate additional strobe extender means, if desired.

4 Claims, 10 Drawing Figures

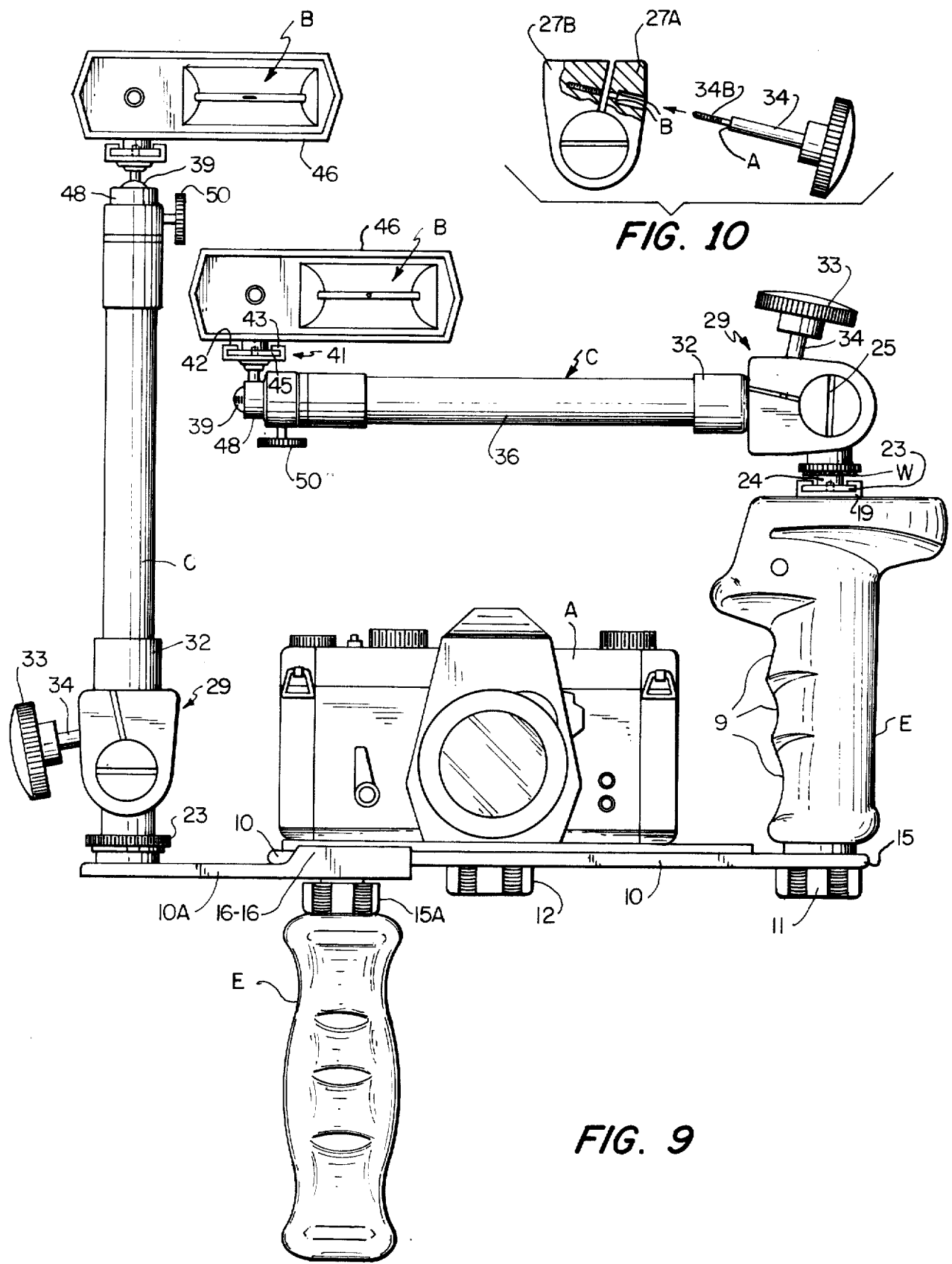

FLASH EXTENDER AND CAMERA SUPPORT

The present invention relates to an adjustable combined remote support for a camera at one end and an electronic flash means at the other end, to thereby provide strobe flash illumination of a subject to be photographed.

More particularly this invention comprises a novel support for a strobe and a camera formed of detachable jointed sections extensible to provide angular adjustments of strobe position for electronic flash illumination from a suitable power source of a subject with respect to the camera for optimum photographic results without careful regard to specific camera shutter speed settings and the need of special films and filters heretofore critical for good photographic results with continuous illumination means.

This combined strobe extender and camera support means makes electronic flash photographs with remote camera position at the base end of the strobe extender means efficient either indoors or outdoors and is a great boon to amateur photographers. Flash illumination with a strobe flash mounted on the end of a universal joint to swivel on the end of an extender section of the extender adds little or no complications to picture-taking, while adding greatly to subject possibilities.

When using flash illumination, it is known to be most effective from 4 to 10 feet. Too close and the picture will have a washed-out faded effect; too far, and the picture will be dark and will not bring out depth of field and visual details.

Also, it is important to be able to adjust the strobe flash means to an angle to any shiny surface, so that the flash does not reflect in the surface and be picked up in the picture. Further to avoid shadows, the subject to be photographed should be kept away from the wall and avoid reflective flash bounce from wall or ceiling when taking the picture.

Further the present novel strobe extender and camera support enhances the efficiency of outdoor photography as artistic lighting effects are provided by using the sum as the main overhead light and strobe as a fill light. Also, the strobe extender and support is ideal for shady areas or when the subject's back is to the sun. This eliminates unnecessary eye squinting and tension in the subject to be photographed. Because of the strobe extender and support size, it can be knocked down to provide for portability and taken anywhere with ease.

For example, instead of setting up cumbersome light stands, the same artistic lighting effects are provided with one strobe extended as an overhead main light and another strobe angled as a fill light for various shadow effects and lighting key ratio. To photograph a large group of subjects two strobe extenders can be mounted from one sturdy tripod to make up the basic photo lighting system.

A prime object of the present invention is to mount the flash strobe away from the camera and the subject and provide means for any angular strobe adjustments, within a 180° radius for example, direct to the subject and to the camera shutter to produce the most ideal pictures. It has been discovered that electronic flash means mounted directly on the camera are less satisfactory and require more careful calculations to compensate for reflection and shutter timing for any photographic results approaching the use of the present strobe extender and remote camera support combination.

Another object is to provide a novel two-way pan joint or hinge for the strobe extender part of the support from the camera mounting portion.

Still another object is to provide a novel strobe extender section formed of telescopic sections and including a swivel locking ball joint on the extensible end of the extender section formed of telescopic sections and including a swivel locking ball joint on the extensible end of the extender section connected to strobe illumination means.

BRIEF DESCRIPTION OF FIGURES

These and other objects of the present invention will become more fully apparent with reference to the following specification and drawings which relate to some preferred embodiments of the invention:

In the drawings:

FIG. 9 is an assembled perspective of an embodiment showing the extension attachment bar of FIGS. 5 and 6 attached to the camera support bar supporting a second strobe extender; and FIG. 10 is a side elevation view of the pan head hinge adjustment and locking bolt means therefor.

Figure 1:
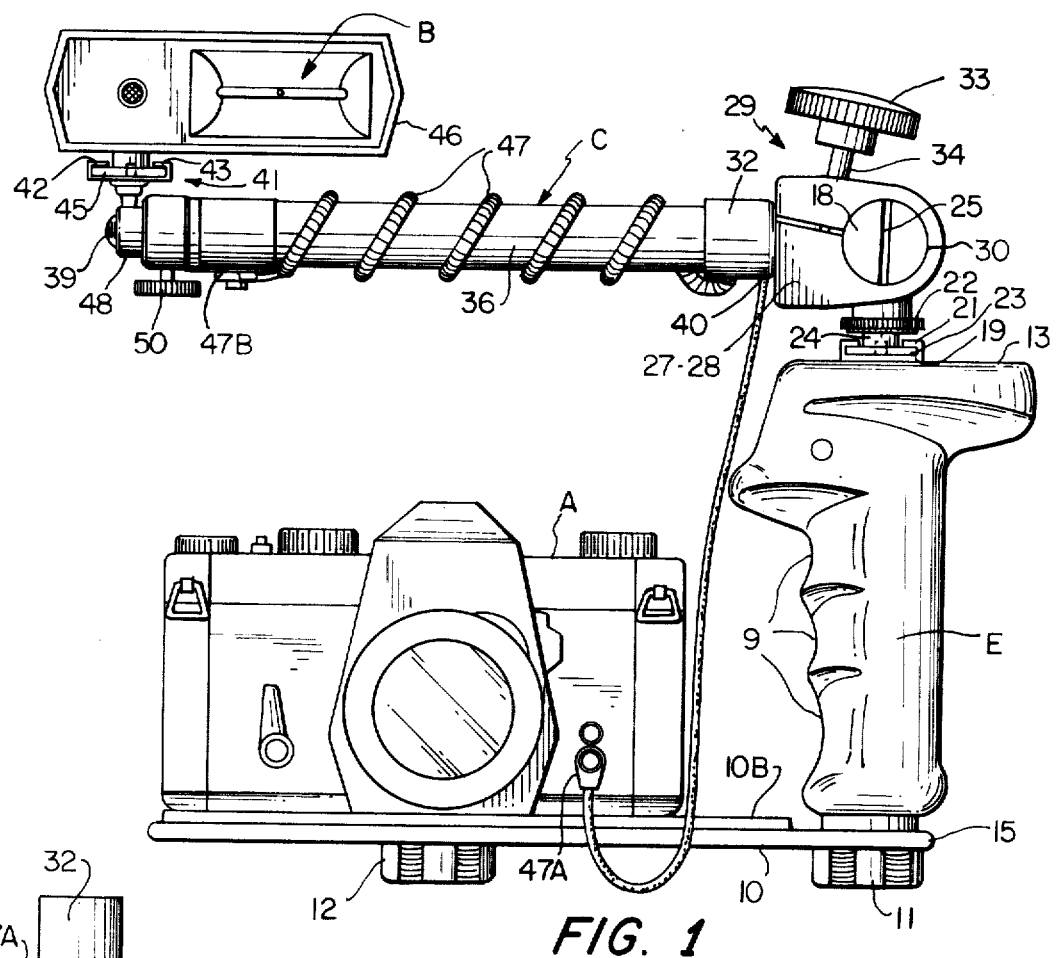
FIG. 1 is an assembled perspective view of the embodiment of a complete strobe extender and camera support unit.

Referring in detail to the drawings and with particular reference to FIG. 1, there is shown an assembled embodiment of the novel strobe extender and support with camera A, and suitable power connected electronic flash illuminating means, such as strobe B attached thereto at respective terminal ends thereof. For example, such power connection is preferably by means of a loosely coiled powercord around the extender to suitable power source means.

The camera A and strobe B each are detachably attached by novel means to each opposite end of novel support extender means C. The extender is formed of a plurality of telescopic sections detachably connectable at the respective lower and upper ends to novel coupler means hereinafter described in detail. These respective coupler means each have specific utility to provide correlated angular adjustments of the strobe extender C for maximum efficiency in electronic flash illumination by strobe B with respect to the shutter speed of the camera A to expose the camera film, not shown.

The strobe extender support C is coupled to a handgrip E formed with finger areas 9, and an enlarged head portion or land surfaces 13 which is effect replaced a usual tripod or mounting head, see FIG. 1.

A camera support bar 10 connects and extends from the base of a handgrip E. The camera support A is secured to the support bar 10 by a suitable standard type connection, such as a locking bolt 12. This bolt type connection is a standard type connection for tripods and other camera support grips. A second connection means 15 comprising a heavy duty male accessory shoe at the foot of the handgrip E slips into a suitable female accessory shoe on the upper plane surface of support bar 10. The connection means 15 is further secured by locking bolt 11.

Also, an anti-friction surface 10B, such as rubber or leather to better grip the base of the camera A to the support bar when secured by the locking bolt 12 may be provided, see FIG. 1.

Secured to the head portion or land surface 13 is a plate 19 formed with inturned side flange means 21 to provide a female accessory of standard size. The female flanged accessory shoe 19 is mounted on the head portion or land surface 13 and is so shaped and proportioned as to mate with a suitable standard type male accessory shoe. This shoe is an end portion of a shaft 24 and is formed with a reduced shank and a button head or shoe 23 to permit frictional sliding engagement in the female accessory under the flange means 21 thereof, see FIGS. 1 and 2.

The pan head 29, includes a trunion joint portion including a pair of spaced ears 27 and 28 with aligned bearing openings or sockets 30 to receive an elongated bearing or trunion shaft 18 with a bifurcated or split end portion 25 in one of the sockets.

Figure 2:
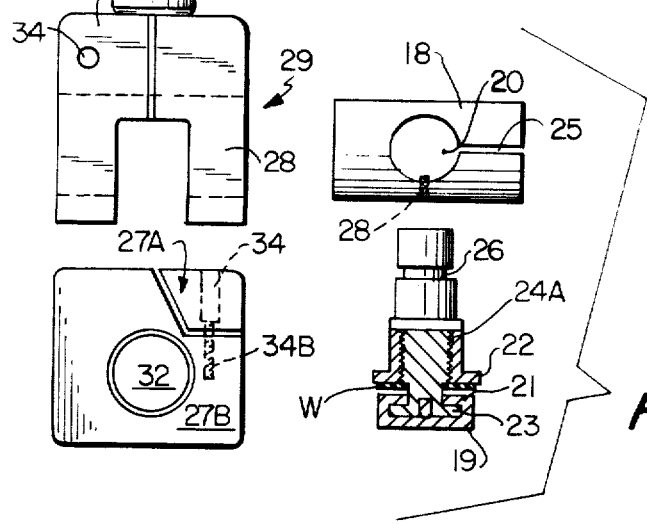
FIG. 2 is a disassembled view of the principle components of the pan head hinge partly in elevation and partly in cross section of the trunion shaft and of the male shoe accessory shaft carried by the trunion shaft and shown assembled in FIG. 1.

In FIG. 2 of the drawing a split ear portion 27B of ear 27 is formed with an aligned threaded bore to mate with the reduced shank 34B of locking bolt 34. For example, in FIG. 10 the locking bolt 34 includes a reduced flanged shoulder 34C which mates with a contersunk surface 34D of the aligned bore in portion 27B. As the reduced thread shank 34B is screwed into the split ear portion 27B, the shoulder 34C of the locking bolt pushes against the flanged surface 34D and closes the split socket 30 ear portion to lock the same to the trunion shaft 18. This bolt 34 extends above the pan head 29 and has a handle 33 mounted thereon to provide for closing and opening the split socket 20 to lock the trunion shaft therein.

The bifurcated end 25 of the trunion shaft 18 provides lateral resiliency for optimum adjustment efficiency when the handle 33 is turned to close or open the split portions of the ear 27 which defines the split socket 30.

The trunion shaft 18 is formed at its central intermediate portion with an opening 20 substantially perpendicular to the axis of the trunion shaft 18 in which is mounted a shaft 24, see FIG. 2. This shaft is formed on one end with a male accessory shoe or button head 23 for frictional sliding engagement in the female accessory shoe 19 on the land 13.

The shank of the shaft 24 above the male shoe 23 is formed with a threaded portion 24A for a flanged nut 22 with an anti-friction means, such as a washer W and a groove 26 so the shaft may be locked in the opening 20 of the trunion shaft 18 by the suitable set screw means 28A.

Thus, as the knob of the bolt 34 is turned it tightens down on the pan head joint 29 to squeeze the bifuractions of the split socket 30 and lock both the trunion shaft 18 and the shaft 24 from angular movement. The knob 33 on bolt 34 may continue to be tightened on the pan head 29 to squeeze the split ear 27, socket 30 until the socket is locked over the end 25 of the trunion shaft. The telescopic extender flanged support nut 32 is mounted on the head of the pan head joint 29.

The extender 36 may be provided with a plurality of telescopic sections 38, for example ten such sections, and terminates at the strobe adjacent end with a suitable swivel locking ball joint 39. This ball joint may impart at 180° radius of swivel movement to a female accessory shoe 41. Shoe 41 is formed with inturned flanges 42 and 43, which embrace a male accessory mount 45 depended from a portion of a strobe casing 46.

A suitable P.C. cored 47 is coiled around the strobe from power connection 47B to allow for extension and contraction thereof. A straight portion of the P.C. cord 47 extends from an attachment 40 to a female connection socket on the camera A where the male P.C. connection plug 47A is attached, see FIG. 1.

The female accessory shoe 41 is connected with a ball collar 48 adapted to hold and cage the ball of the swivel ball joint 39. This ball joint may be locked in any swivelled angular position by an adjustment locking knob 50 through its 180° radius range so as to provide for desired angular movement to the strobe carried thereby.

The telescopic extender sections 38 may be manually extended to collapsed as required for most efficient strobe flash illumination of subjects to be photographed by shutter operation to expose the film in the camera A supported at the hand grip portion E of the strobe support means C. More specifically the telescopic extender consists, for example, of ten telecopic sections or extensions 38 with locking detent pins 51 and U-shaped elongated grooves 52 stemming down opposite sides of the respective sections. These grooves and pins stablize the sections from twisting or collapsing when there is an uneven weight or torque produced due to angle and position of the extended strobe. The locking detent pins 51 are perpendicular to the grooves and preferably are staggered in opposite directions in every other section or extension 38. This creates and maintains an even balance and permits a smooth torque free collapse of the telescopic sections.

Figure 3:
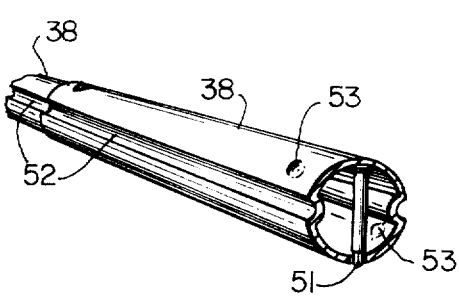
FIG. 3 is a perspective view of some of the telescopic sections of the strobe extender partially extended showing some of the locking detent pins, detent locking opening and side U-shaped stablizing and guide grooves of the respective telescopic sections.

In reference to FIG. 3, are indent stops 53. When collapsing the telescopic sections, these stops prevent the next adjacent telescopic section from shearing off the locking detent pin 51 of the latter or trailing telescopic section. The sudden stop also initiates the disengagement of the detent pin 51 in the preceeding telescopic section.

Figure 7:
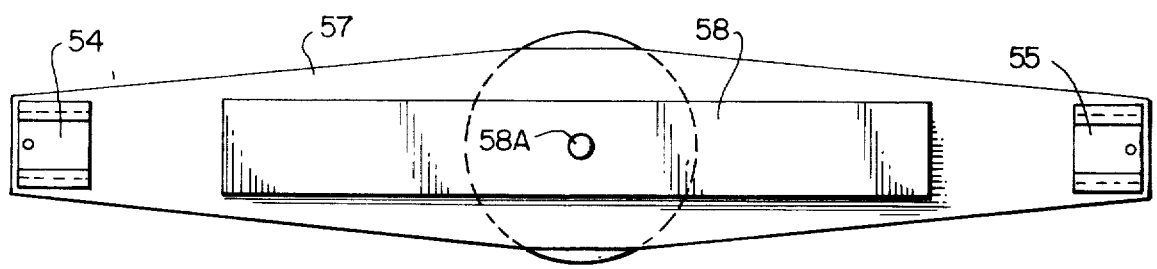
FIG. 7 is another embodiment of a camera mount centrally thereof for connection to a handle head or to a tripod with radially positioned female accessory shoe mounts to couple to the respective base ends of each strobe extender.

As shown in FIG. 7 a second embodiment of the invention provides additional female accessory shoes 54 and 55 to receive the male accessory shoe 23 of additional strobe extenders.

Figure 8:
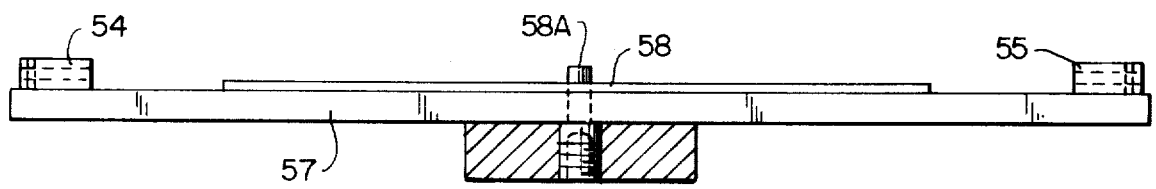
FIG. 8 is a side elevation of FIG. 7.

Also, as shown in FIG. 8 is a mounting bar 57. This bar is provided with a center mounting bolt 58A extended through an anti-friction surface 58 formed of rubber or leather to enhance the grip to the metal base of a comera which may be secured to the bar by the locking or mounting bolt between the two female accessory shoe mounts of each end of the plate 57. Thus there is provided a dual mounting arrangement for example of two strobe extenders on any suitable tripod or base surface.

Figure 5:
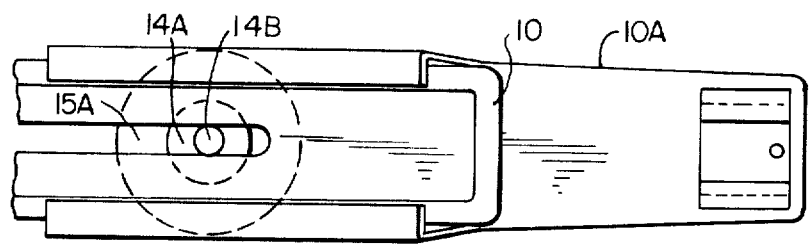
FIG. 5 is a top view in elevation of the camera support bar extension attachment used to support a second strobe extender.
Figure 6:
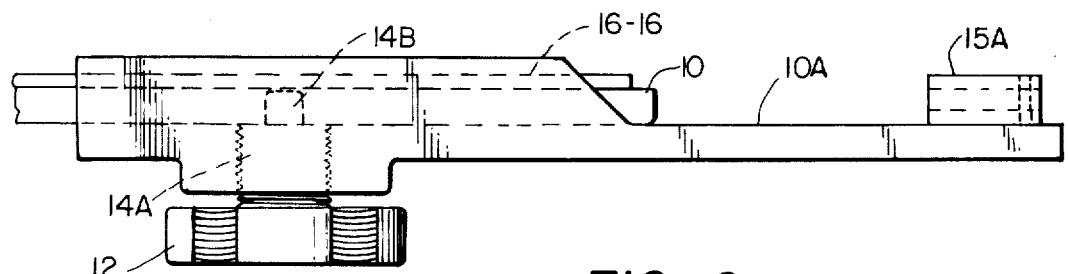
FIG. 6 is a side elevation view of FIG. 5.
Figure 4:
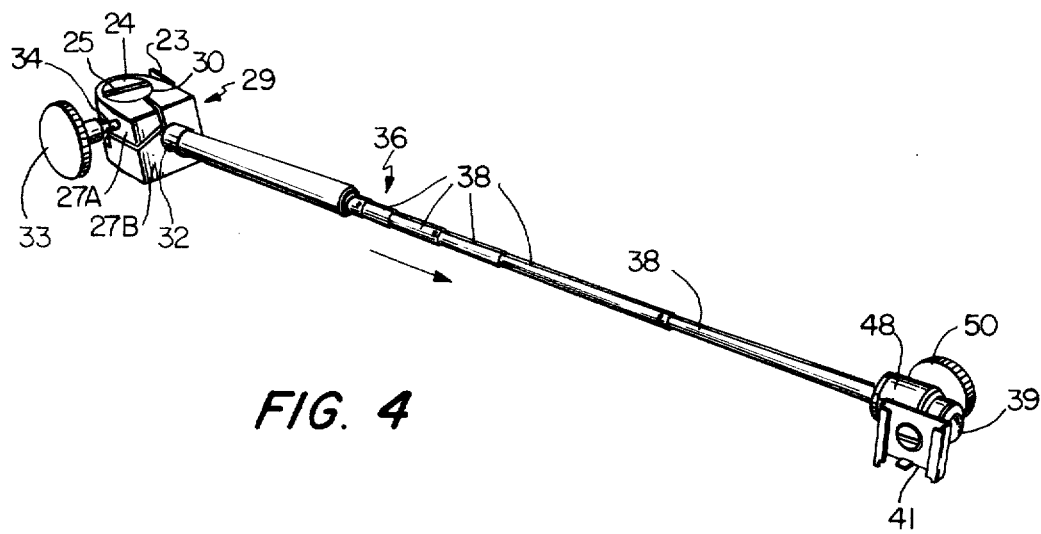
FIG. 4 is a perspective view of the strobe extender per se separated from the camera support means and partially extended to emphasize that the same may be distributed separately as an article of manufacture or stored as a shelf item.

In reference to the camera bar extension 10 shown in FIGS. 5 and 6 and the assembled view of another embodiment of the invention illustrated in FIG. 9, there is shown the extension attachment bar 10A for supporting a second similar strobe extender unit C. A second hand grip E connects by a second locking bolt and nut 15A to the extension attachment bar 10A. This bar 10A includes a relatively large heavy duty female accessory shoe 10 that slips over the end of the support bar 10 and is secured by the locking means 15A from the bottom of the extension support bar 10A. Each strobe extender C is equipped with standard accessory mounts and thus may be mounted on any number of varieties of sturdy hand grip and camera supports.

As shown in FIGS. 5 and 6 a relatively wide locking bolt 14A with a reduced shank 14B screws into extension attachment 10A and applies pressure to lock camera support bar 10 between the inturned flanges 16 and 16 of the extension attachment and the flat surface of the locking bolt 14A. The reduced shank 14B of the locking bolt fits into the adjustment space for camera support locking means 12. This prevents any chance of the extension 10A attachment from slipping or being pulled off the end of the camera support bar 10.

Thus there may be provided several independent strobe extender units to adapt the assembly to mount two or more strobe flash extenders to suitable camera support means for large group photography and the like.

It is to be expressly understood that the preferred embodiments of the present invention shown and described herein are for the purpose of example and are not intended to limit the scope of the appended claims.

What is claimed is:

1. A photographic apparatus including in combination a camera, a support plate releasably coupled to said camera, said support plate having a land portion, said land portion having releasable coupling means thereon, a telescopic extender means having a first end coupled to said land portion at said releasable coupling means and a second end connected to a flash illumination means, the improvement comprising:

trunion joint means connecting said releasable coupling on said land means to said first end of said telescopic extender for providing pivotal movement of said telescopic extender about a first axis and about a second axis perpendicular to said first axis, said trunion joint means including a trunion joint portion having a pair of spaced ears with aligned sockets, a trunion shafted mounted at opposite ends in said ear sockets, one of said ears providing a split socket for one end of said shaft, said trunion shaft having an opening through a medial portion thereof, and a second shaft mounted in said trunion shaft opening, said second shaft being connected to said land portion of said support plate by said releasable coupling in said ear with the said split socket having bifurcated portions formed with aligned threaded and unthreaded bore portions on respective sides of the split portion of said ear, a locking bolt with a reduced end in said bore portions, and handle means to rotate said bifurcated portions of said ear together, to thereby frictionally grip one end of said trunion shaft in said split ear socket and lock said trunion shaft to set angular positions, said trunion shaft being longitudinally bifurcated at an end to provide lateral resiliency for optimum adjustment efficiency in said split socket and wherein said bolt is formed with a threaded reduced end with a shoulder portion, said shoulder mating with a countersunk surface in said unthreaded bore to impart thrust to said surface; and ball joint means coupling said second end of said telescopic extender to said flash illumination means to provide angular movement of said flash illumination means about said second end of said telescopic extender.

2. Strobe extender and camera support means as described in claim 1, wherein said telescopic extender consists of a plurality of telescopic sections with locking detent pins and formed with U-shaped elongated grooves stemming down opposite sides, said detent pins being perpendicular to said grooves and staggered in opposite directions in every other section, to thereby create and maintain an even balance and provide for a smooth torque free collapse of the telescopic sections.

3. Strobe extender support means as described in claim 2, wherein stop means are formed in each of said sections, to thereby prevent each next adjacent preceding section from shearing off the locking detent pint of a trailing section and to initiate the disengagement of the detent pin in said next adjacent preceding section during extension or retraction of said extender sections.

4. The photographic apparatus of claim 1, wherein said support plate includes a camera support bar and an extensible bar connectable to said camera support bar for supporting at least one additional strobe extender, said extensible bar at one end being formed with spaced inturned flange means and being slidably connected with an end of said camera support bar, said camera support bar being centrally formed with an elongated longitudinal slot and an internally threaded socket, a threaded bolt with a shoulder and a reduced threadless shank extending from said shoulder, said shank being extensible into said slot and an adjustment knob on said bolt to engage the face of said shoulder with the underside of said extensible bar on each side of said slot.

* * * * *